United States Patent [19]
Heysse et al.

[11] Patent Number: 6,020,741
[45] Date of Patent: Feb. 1, 2000

[54] WELLBORE IMAGING USING MAGNETIC PERMEABILITY MEASUREMENTS

[75] Inventors: Dale R. Heysse, Sugarland; Roland E. Chemali, Fort Worth, both of Tex.

[73] Assignee: Halliburton Energy Services, Inc., Houston, Tex.

[21] Appl. No.: 09/098,253

[22] Filed: Jun. 16, 1998

[51] Int. Cl.[7] .............................. G01V 3/08; G01V 3/10; G01V 3/12

[52] U.S. Cl. ................................ 324/339; 702/7

[58] Field of Search .................... 324/338, 339, 324/340, 341, 343, 355, 357, 367; 702/6, 7

[56] References Cited

U.S. PATENT DOCUMENTS 4,567,759  2/1986  Ekstrom et al. .................... 324/355

*Primary Examiner*—Walter E. Snow
*Attorney, Agent, or Firm*—Conley, Rose & Tayon

[57] ABSTRACT

A wellbore imaging tool is provided which is sensitive to magnetic permeability changes in the wellbore wall. In one embodiment, the measuring array comprises a transmitter coil, an array of receiver coils, and a signal processor. The transmitter coil generates an oscillating magnetic field in the wellbore wall, and each of the receiver coils generates a voltage indicative of a direct inductive coupling strength between the receiver coil and the transmitter coil. Variations in the magnetic permeability of the wellbore wall will cause the direct inductive coupling strength between the transmitter and receiver coils to vary accordingly. The signal processor is coupled to each of the receiver coils to determine the direct inductive coupling strength and configured to convert it into a pixel value for each of the receiver coils. The pixel value may represent the magnetic permeability of a wall region proximate to the receiver coil, or it may represent the direct inductive coupling strength. An image generator may take the pixel values and organize them into an image for display. Each of the receiver coils may comprise a first coil wound in a first direction and a second coil wound in a second direction and coupled in series with the first coil to balance the receiver coil with respect to the transmitter coil. Advantageously, direct inductive coupling measurements are not hindered by drilling mud conductivity or by the acoustic distortion of water droplets in the drilling mud. A high resolution image of wellbore walls may thus be obtained by this measurement technique when other techniques fail.

20 Claims, 3 Drawing Sheets

WELLBORE IMAGING USING MAGNETIC PERMEABILITY MEASUREMENTS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to a logging system for measuring magnetic permeability characteristics of formations through which a wellbore has been drilled. More particularly, the present invention relates to a system for imaging wellbore walls using arrays of induction coils configured to detect magnetic permeability variations in the wellbore walls.

2. Description of the Related Art

Modern petroleum drilling and production operations demand a great quantity of information relating to parameters and conditions downhole. Such information typically includes characteristics of the earth formations traversed by the wellbore, in addition to data relating to the size and configuration of the wellbore itself. The collection of information relating to conditions downhole, which commonly is referred to as "logging," can be performed by several methods. Oil well logging has been known in the industry for many years as a technique for providing information to a driller regarding the particular earth formation being drilled. In conventional oil well wireline logging, a probe or "sonde" is lowered into the wellbore after some or all of the well has been drilled, and is used to determine certain characteristics of the formations traversed by the wellbore. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the wellbore, as the sonde is pulled uphole.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors.

While wireline logging is useful in assimilating information relating to formations downhole, it nonetheless has certain disadvantages. For example, before the wireline logging tool can be run in the wellbore, the drillstring and bottomhole assembly must first be removed, or tripped, from the wellbore, resulting in considerable cost and loss of drilling time for the driller (who typically is paying daily fees for the rental of drilling equipment). In addition, because wireline tools are unable to collect data during the actual drilling operation, drillers possibly must make decisions (such as the direction to drill, etc.) without sufficient information, or else incur the cost of tripping the drillstring to run a logging tool to gather more information relating to conditions downhole. In addition, because wireline logging occurs a relatively long period after the wellbore is drilled, the accuracy of the wireline measurement can be questionable. As one skilled in the art will understand, wellbore conditions tend to degrade as drilling fluids invade the formation in the vicinity of the wellbore. In addition, the wellbore shape may begin to degrade, reducing the accuracy of the measurements.

Because of these limitations associated with wireline logging, there recently has been an increasing emphasis on the collection of data during the drilling process itself. By collecting and processing data during the drilling process, without the necessity of tripping the drilling assembly to insert a wireline logging tool, the driller can make accurate modifications or corrections "real-time", as necessary, to optimize drilling performance. For example, the driller may change the weight-on-bit to cause the bottomhole assembly to tend to drill in a particular direction. Moreover, the measurement of formation parameters during drilling, and hopefully before invasion of the formation, increases the usefulness of the measured data. Further, making formation and wellbore measurements during drilling can save the additional rig time which otherwise would be required to run a wireline logging tool.

Techniques for measuring conditions downhole, and the movement and location of the drilling assembly contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used with the understanding that the term encompasses both the collection of formation parameters and the collection of information relating to the position of the drilling assembly while the bottomhole assembly is in the well. The measurement of formation properties during drilling of the well by LWD systems improves the timeliness of measurement data and, consequently, increases the efficiency of drilling operations. Typically, LWD measurements are used to provide information regarding the particular formation in which the wellbore is traversing.

For a formation to contain petroleum, and for the formation to permit the petroleum to flow through it, the rock comprising the formation must have certain well known physical characteristics. One characteristic is that the formation has a certain measurable resistivity (or conductivity), which can be determined by inducing an alternating electromagnetic field into the formation by a transmitter coil arrangement. The electromagnetic field induces alternating electric currents (often called eddy currents) in the formation in paths that are substantially coaxial with the transmitter. These currents in turn create a secondary electromagnetic field in the medium, inducing an alternating voltage at the receiver coil. If the current in the transmitter coil is kept constant, the eddy current intensity is proportional to the conductivity of the formation. Consequently, the conductivity of the formation determines the intensity of the secondary electromagnetic field, and thus, the amplitude of the voltage at the receiver coil. This technique is commonly referred to as "induction logging". Resistivity may also be directly measured using electrodes, as is described in U.S. Pat. No. 4,468,623 "Method and apparatus using pad carrying electrodes for electrically investigating a borehole" by Gianzero et al. which issued Aug. 28, 1984.

The scale with which characteristic measurements are performed has tended to become finer as time goes on, in order to provide more detailed characterization of the lithography traversed by the wellbore walls. At the finer scales, the performance of the resistivity characterization is increasingly impaired when the resistivity of the drilling mud is significantly higher than the resistivity of the formation, as is often the case with oil-based synthetic muds. The formation of a mud cake on the wellbore wall can further impair the performance of the resistivity method. Acoustic methods encounter difficulty with heavy muds, or when a significant amount of gas is in the drilling mud.

It is desirable to have a high-resolution characterization technique which is not impaired by the resistivity of the drilling mud or the presence of a mud cake on the wellbore wall. Such a technique would advantageously be usable for imaging wellbore walls under a wide variety operating conditions, and would preferably be safe and inexpensive to operate.

SUMMARY OF THE INVENTION

The problems outlined above are in large part solved by a measuring array which is sensitive to magnetic permeability changes in the wellbore wall. In one embodiment, the measuring array comprises a transmitter coil, an array of receiver coils, and a signal processor. The transmitter coil generates an oscillating magnetic field in the wellbore wall, and each of the receiver coils generates a voltage indicative of a direct inductive coupling strength between the receiver coil and the transmitter coil. Variations in the magnetic permeability of the wellbore wall will cause the direct inductive coupling strength between the transmitter and receiver coils to vary accordingly. The signal processor is coupled to each of the receiver coils to determine the direct inductive coupling strength and configured to convert it into a pixel value for each of the receiver coils. The pixel value may represent the magnetic permeability of a wall region proximate to the receiver coil, or it may represent the direct inductive coupling strength. An image generator may take the pixel values and organize them into an image for display. Each of the receiver coils may comprise a first coil wound in a first direction and a second coil wound in a second direction and coupled in series with the first coil to balance the receiver coil with respect to the transmitter coil. Advantageously, direct inductive coupling measurements are not hindered by drilling mud conductivity or by the acoustic distortion of water droplets in the drilling mud. A high resolution image of wellbore walls may thus be obtained by this measurement technique when other techniques fail.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

Figure 1:
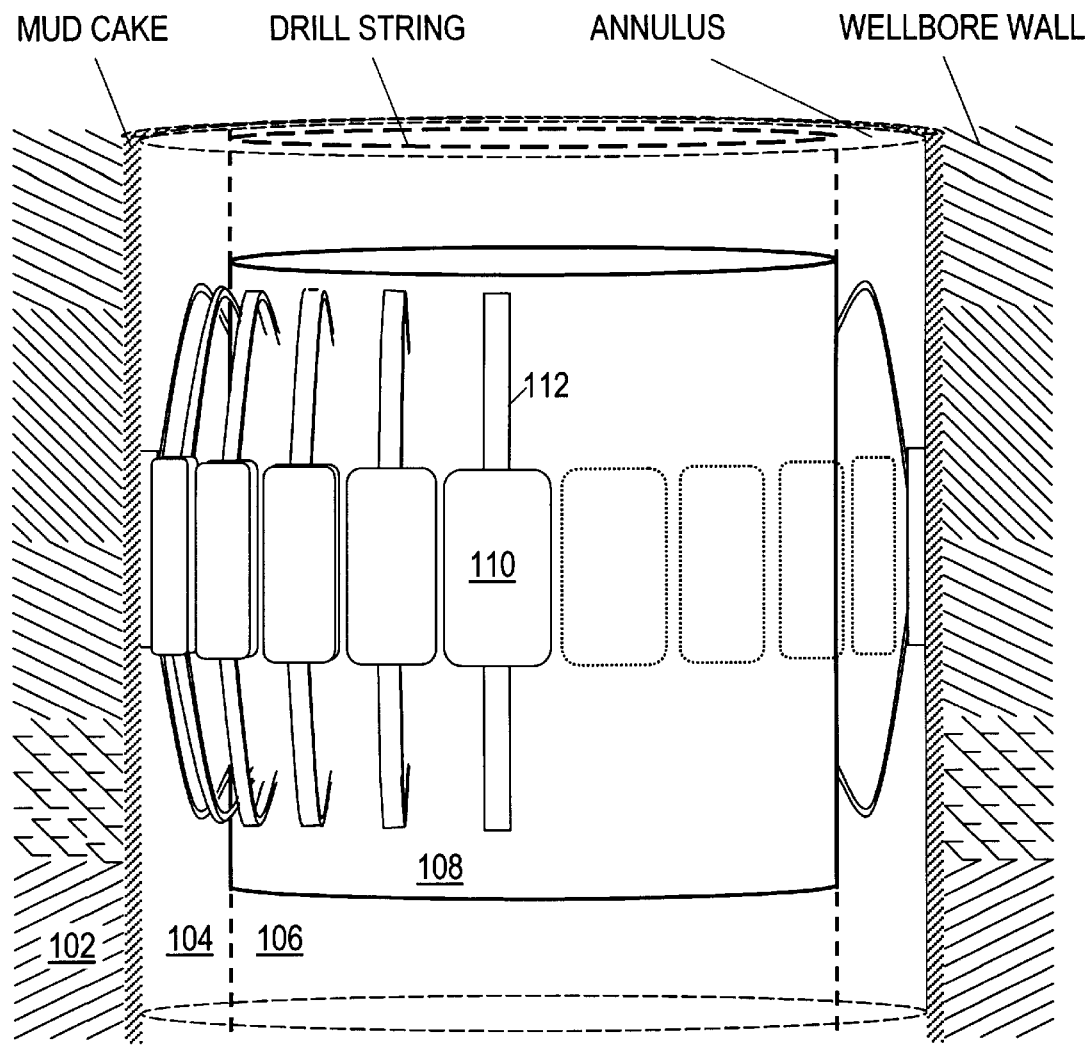
FIG. 1 illustrates a wellbore imaging tool in operations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Turning now to the figures, FIG. 1 illustrates a rock formation 102 traversed by a wellbore 104. Within the wellbore 104 is a drillstring 106 which includes an imaging tool 108. Imaging tool 108 includes a plurality of sensor pads 110 which are held in close proximity to the walls of wellbore 104 by support apparatus 112. The configuration of imaging tool 108 shown in FIG. 1 is exemplary only, and many alternate configurations are also contemplated. For example, it is contemplated that the support apparatus 112 may be stabilizer blades, hydraulic cylinders, springs, or a fixed support ring. Nonetheless, proximity to the borehole wall is helpful, and as such, a stabilizer blade location is preferred. It is also contemplated that more than one row of sensor pads 110 be employed in order to remove "seams" in the final wellbore wall image. Further, it is contemplated that imaging tool 108 may be configured as a wireline tool.

As imaging tool 108 moves along wellbore 104, the sensor pads 110 perform magnetic permeability measurements on the rock formation 102 in order to create an image of the walls of wellbore 104. The images so produced may be used to determine the lithography and configuration of rock formation 102. With this information, drilling adjustments can be made to maximize the production of the well, and consequently reduce the costs of petroleum production.

Figure 2:
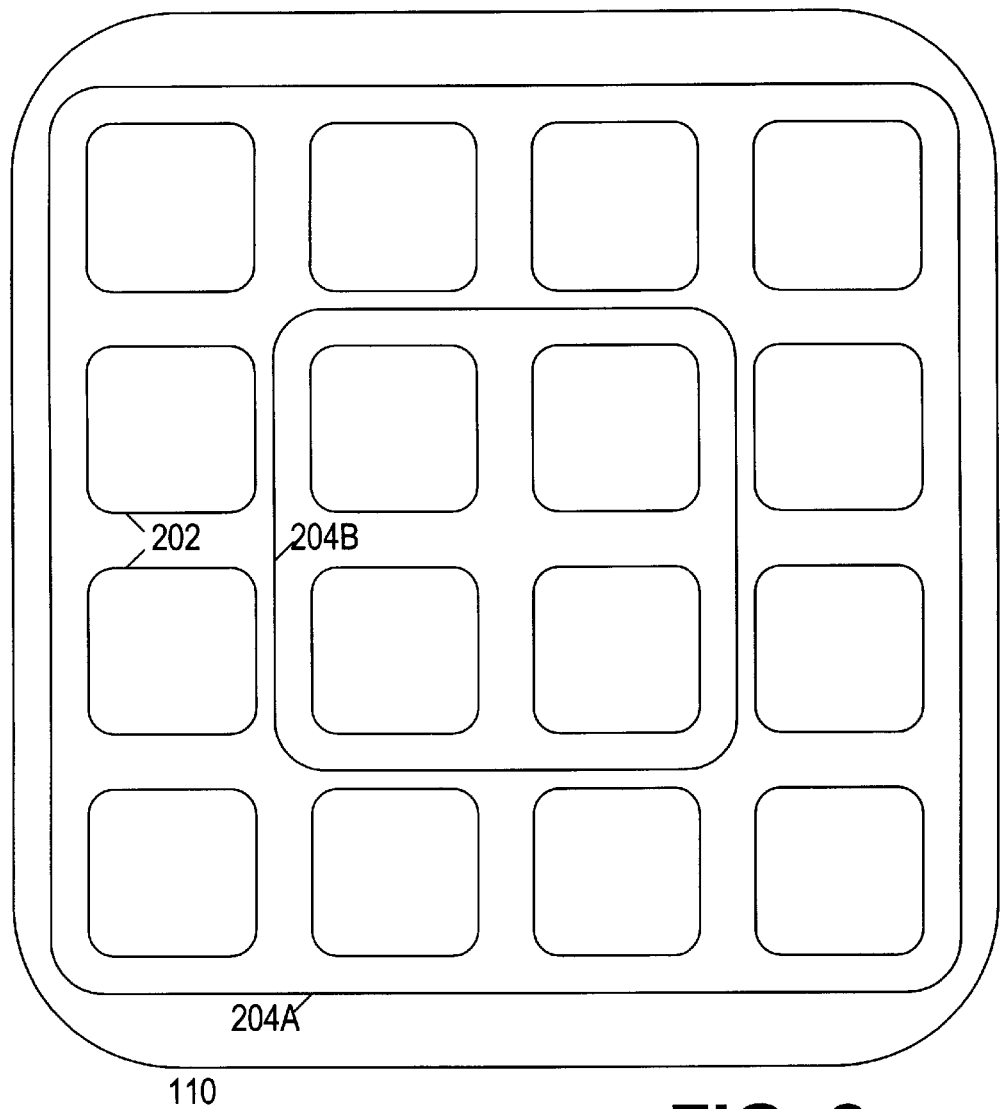
FIG. 2 illustrates a transmitter and receiver coil array on a sensor pad.

FIG. 2 illustrates an exemplary configuration of sensor pad 110. An array of small receiver coils 202 is arranged in a grid on sensor pad 110. Also shown are alternate positions 204A and 204B for a transmitter coil. The size and spacing of receiver coils 202 is chosen according to the desired resolution of the wellbore wall image. In one embodiment, the desired resolution is better than 10 mm×10 mm. The receiver coils have an inner dimension of 5 mm or less and are spaced apart by 2.5 mm or less so that their coverage overlaps. The receivers may be of various geometries, and even may be arranged in a vertical column. As is discussed further below, the receiver coils are sensitive to a changing magnetic field. A changing magnetic field is provided by a transmitter coil 204, which may be placed in various locations with respect to the receiver coils. In one embodiment, the transmitter coil is located on the periphery of the receiver coils as shown by transmitter coil 204A. In another embodiment, the transmitter coil is located among the receiver coils as shown by transmitter coil 204B. Alternatively, multiple transmitters may be used. The tool itself is preferably constructed with a single transmitter, and multiple receiver elements positioned within the transmitter. Nonetheless, when multiple transmitters are used, they may transmit at different frequencies, or there may be a spare in case of failure. To produce the changing magnetic field, the transmitter coil is excited by an alternating signal which may have a frequency in the range between 20 kHz and 2 MHz. Over 100 kHz performance begins to degrade.

It is noted that both the receiver and transmitter coils on sensor pad 110 may vary in size and shape. In one embodiment, the coils are all circular, and in another embodiment, the coils are rectangular and of varying sizes.

Figure 3:
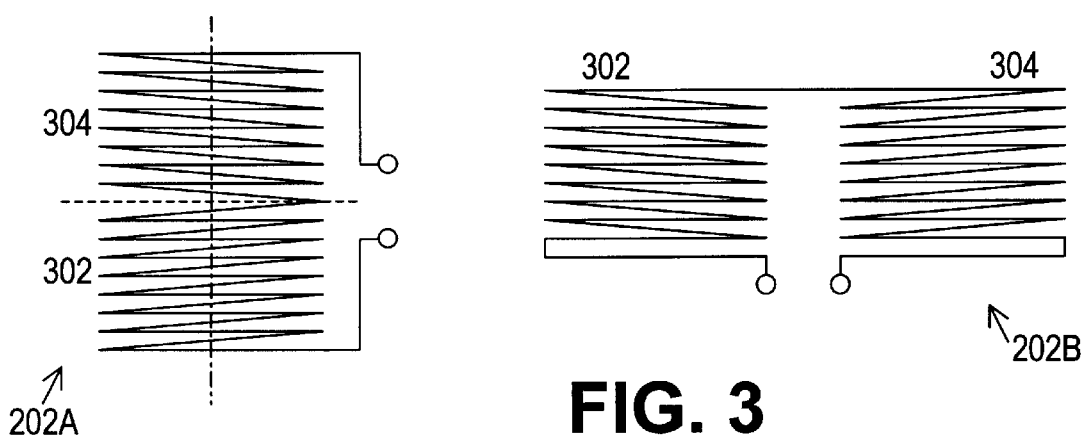
FIG. 3 illustrates two balanced receiver coil configurations.

FIG. 3 illustrates a co-axial receiver coil configuration 202A and a parallel receiver coil configuration 202B. Each of the receiver coils comprises two portions 302 and 304. The first portion 302 is wound in a first direction, and the second portion 304 is "counterwound", i.e. wound in the opposite direction to the first. Since the windings are opposite, the voltages induced by the transmitter coil in the two portions are of opposite sign. When the voltages also have equal magnitude, the receiver coil is "balanced" with respect to the transmitter coil. The placement, area enclosed, and number of windings of one portion may be varied with respect to the other portion so that the receiver coil is balanced in free space, i.e. in the absence of any material in front of sensor pad 110. In this situation, the receiver coils 202 produce a zero voltage in direct response to the excitations by the transmitter coil. The issue of indirect responses will be discussed further below.

The magnetic permeability $\mu$ of materials is sometimes expressed as $\mu = \mu_r \mu 0$, where $\mu 0$ is $4\pi \times 10^{-7}$ H/m, the permeability of free space, and $\mu r$ is the relative permeability of the material. Materials with high permeability are more "conductive" to magnetic fields and act to strengthen magnetic couplings. When materials with relative permeabilities greater than one are present in front of a sensor pad 110, the coupling from the transmitter coil to the two portions of the receiver coils is no longer balanced. The coil portion closer to the material couples to the transmitter coil more strongly than the portion further away, and the receiver coil generates a voltage proportional to the imbalance.

Figure 4:
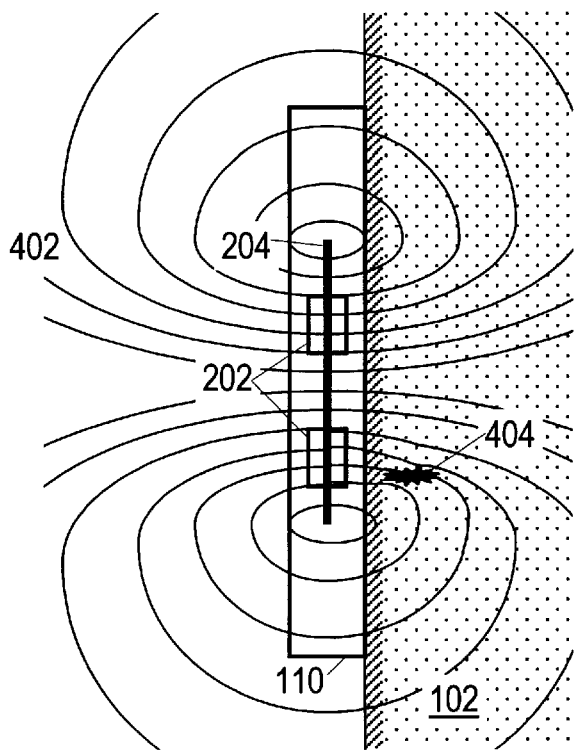
FIG. 4 illustrates the principle of operation of the wellbore imaging tool.

FIG. 4 illustrates the principle of operation of imaging tool 108. A sensor pad 110 is placed proximate to rock formation 102. Transmitter coil 204 generates a changing magnetic field illustrated by flux lines 402. The field for the upper receiver coil 202 is undisturbed by rock formation 102, and the transmitter coil 204 couples equally to both sides of the upper receiver coil, so that no voltage is induced. The field for the lower receiver coil is disturbed by a inhomogeneity 404 having a magnetic permeability greater than one. The transmitter coil therefore couples more strongly to the portion of the receiver coil closest to the inhomogeneity 404, and the lower receiver coil generates a voltage.

It is noted that FIG. 4 is primarily for explanatory purposes, and is not intended to limit the implementation of the invention. The flux line geometry is not intended to be representative of any specific transmitter/receiver coil geometry. In particular, the adjacent receiver coils preferably have overlapping measurement regions in order to provide some redundancy and error correction to the image data. As such, an inhomogeneity will normally affect more than one receiver coil at a time. Indeed, borehole imaging is defined by the overlapping or very nearly overlapping geometry of the receiver spot size.

It is also noted that drilling mud is present in the wellbore, and it is expected that the drilling mud will have formed a layer coating the wellbore walls, often referred to as a mud cake. In the presence of the drilling mud, the sensor pad 110 will not rest directly against the wellbore wall. For other sensing methodologies, such as acoustic and resistive sensing, the ever-present mud can interfere with the measurements and seriously degrade the image quality. However, the relative magnetic permeability of the mud is homogeneous, so the mud will not affect magnetic permeability measurements of the wellbore wall.

Figure 5:
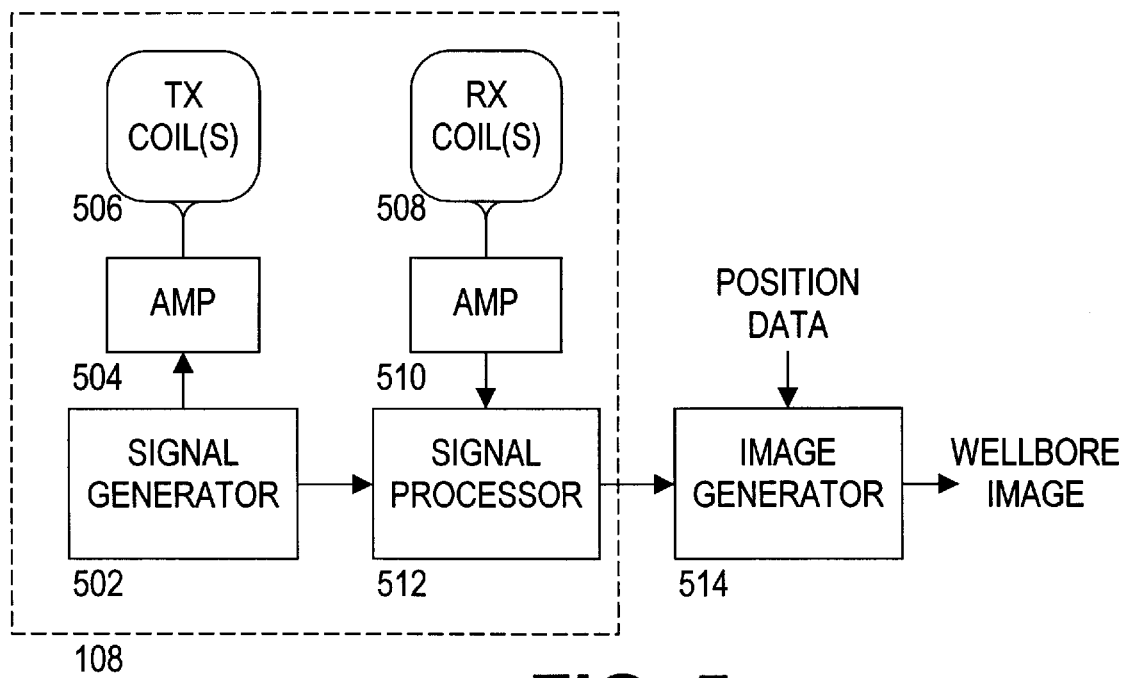
FIG. 5 provides a block diagram of a system employing the wellbore imaging tool.

FIG. 5 is a block diagram of a system employing image tool 108. A signal generator 502 generates a sinusoidal signal. Amplifier 504 amplifies the signal and drives the transmitter coil 506. In one embodiment, an array of transmitter coils is driven by amplifier 504. The transmitter coil(s) 506 produce an oscillating magnetic field as described previously. The receiver coils 508 respond to disturbances in the magnetic field by producing a voltage signal. The signal from each receiver coil 508 is amplified by an amplifier 510 and provided to a signal processor 512. Signal processor 512 determines a magnetic permeability value for a region of the wellbore wall immediately proximate to each receiver coil 508. The array of magnetic permeability values so produced is provided to an image generator 514. Image generator 514 correlates this data with position data received from a separate source to produce an image of the wellbore wall.

In one embodiment, signal processor 512 sequentially samples voltages from each receiver coil 508 and determines a corresponding magnetic permeability value. The determined permeability value may be a function of the receiver coil voltage, the average voltages from other receiver coils, and the estimated distance to the wellbore wall. This occurs because the size, distance, and magnetic permeability value of the exemplary inhomogeneity of FIG. 4 all play a role in the magnitude of the imbalance. Some of these factors may be compensated for by examining the imbalance adjacent coils and by monitoring the distance to the wellbore wall. In another embodiment, signal processor 512 avoids these compensation calculations by simply determining a contrast value indicative of the strength of the direct coupling between the transmitter coil and receiver coil. The output of signal processor 512 may be a sequence of pixel intensity values, and the image generator determines the respective placement of the pixel values to form the image.

Signal processor 512 must also compensate for indirect coupling. When sensor pad 110 is adjacent to conductive media, transmitter coil 506 will induce eddy currents to flow, which will in turn induce a voltage in the receiver coils 508. These indirectly induced voltages are 180 degrees out of phase with the signal in the transmitter coil, while any unbalance voltages directly induced by the transmitter coil are only 90 degrees out of phase. The signal processor 512 should consequently be configured to filter out the voltage signals which are not of interest, and to thereby determine the imbalance voltages which are due to direct coupling from the transmitter coil.

The position data is made available by a separate source. Many systems exist for determining the position and orientation of equipment in wellbores, and hence will not be discussed here. In the absence of such equipment, the wellbore walls may still be imaged, but any map of the walls will tend to be inaccurate, and the usage of the image information will be inhibited.

Numerous variations and modifications will become apparent to those skilled in the art once the above disclosure is fully appreciated. It is intended that the following claims be interpreted to embrace all such variations and modifications.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A wellbore wall imaging tool for use in a well bore, comprising:

a transmitter configured to generate a magnetic field; and a plurality of receiver coils arranged to generate an image of said borehole, wherein each of the receiver coils includes a first portion wound in a first direction and a second portion wound in an opposite direction, wherein the plurality of receiver coils is configured to generate a plurality of respective voltages indicative of a plurality of respective relative magnetic permeability values in regions proximate to the receiver coils, wherein the plurality of receiver coils is coupled to a signal processor, and wherein the signal processor is configured to determine a pixel intensity value signal for each of the receiver coils.

2. The wellbore wall imaging tool of claim 1, wherein the pixel intensity value signal for a receiver coil represents the relative magnetic permeability of a region of said borehole proximate to the receiver coil.

3. The wellbore wall imaging tool of claim 1, wherein the wellbore wall imaging tool wherein said transmitter coil is configured to generate an oscillating magnetic field that couples equally to the first and second portions of each of the receiver coils when no magnetic material wall is present, and wherein the signal processor is configured to determine an imbalance voltage in each of the receiver coils caused by direct coupling between the transmitter coil and the receiver coils.

4. The wellbore wall imaging tool of claim 3, wherein the pixel intensity value signal for a receiver coil represents the imbalance voltage in each of the receiver coils caused by direct coupling between the transmitter coil and the receiver coils.

5. The wellbore wall imaging tool of claim 3, wherein the signal processor is configured to filter out imbalance voltages in each of the receiver coils caused by indirect coupling between the transmitter coil and receiver coils.

6. The wellbore wall imaging tool of claim 3, wherein the first and second portions are adjacent and coaxial.

7. The wellbore wall imaging tool of claim 3, wherein the first and second portions are adjacent and parallel.

8. The wellbore wall imaging tool of claim 3, wherein the receiver coils are spaced circumferentially about the well imaging tool.

9. The wellbore wall imaging tool of claim 3, wherein each of the pixel intensity value signals comprises a sequence of pixel value samples, and wherein the signal processor interleaves the sequences to form a single output sequence.

10. The wellbore wall imaging tool of claim 9, wherein the signal processor provides the output sequence to an image generator, and wherein the image generator converts the output sequence into image data.

11. A wellbore wall imaging tool which comprises:

at least one transmitter coil configured to generate an oscillating magnetic field;

an array of receiver coils, wherein each of the receiver coils is configured to generate a voltage indicative of a direct inductive coupling strength between the given receiver coil and the transmitter coil;

a signal processor coupled to each of the receiver coils to determine the direct inductive coupling strength and configured to convert the direct inductive coupling strength for each of the receiver coils into a pixel value for each of the receiver coils, wherein said pixel values are suitable for combination into a wellbore image.

12. The wellbore wall imaging tool of claim 11, wherein each receiver coil comprises a first portion wound in a first direction and a second portion wound in a second direction, wherein the first and second portions are coupled in series and are balanced with respect to the transmitter coil.

13. The wellbore wall imaging tool of claim 11, wherein the first and second portions are coaxial.

14. The wellbore wall imaging tool of claim 11, wherein the pixel value signal for each receiver coil represents the relative magnetic permeability of a wall region proximate to the receiver coil.

15. The wellbore wall imaging tool of claim 11, wherein the pixel value signal for each receiver coil represents the voltage in each of the receiver coils caused by direct coupling between the transmitter coil and the receiver coils.

16. The wellbore wall imaging tool of claim 11, wherein the signal processor is configured to filter out voltages in each of the receiver coils caused by indirect coupling between the transmitter coil and receiver coils.

17. The wellbore wall imaging tool of claim 11, wherein the signal processor provides the pixel values to an image generator, and wherein the image generator converts the pixel values into said wellbore image.

18. A method for imaging a wellbore wall, wherein the method comprises:

generating an oscillating magnetic field in the wellbore wall, wherein said generating includes driving a transmitter coil with an oscillating signal;

detecting a directly induced voltage in each of a plurality of receiver coils, each receiver coil corresponding to a spot of said wellbore wall and the spot of each receiver coil at least partially overlapping with a spot corresponding to another receiver coil;

converting each detected directly induced voltage into a pixel value;

determining a location of each pixel value relative to a desired viewing location;

displaying all pixels within a predetermined distance of the viewing location.

19. The method of claim 18, wherein detecting comprises:

correlating each receiver coil voltage with the oscillating signal to produce a correlation signal for each receiver coil;

periodically sampling the correlation signals to determine induced voltages 90 degrees out of phase with the oscillating signal.

20. The method of claim 18, wherein converting comprises calculating a magnetic coupling strength between the transmitter coil and the receiver coil.

* * * * *